(12) United States Patent
Sajrawi

(10) Patent No.: US 12,333,920 B2
(45) Date of Patent: Jun. 17, 2025

(54) EARTHQUAKE DETECTION AND ALARM UNIT AND SYSTEM

(71) Applicant: Sami Sajrawi, Abu Snan (IL)

(72) Inventor: Sami Sajrawi, Abu Snan (IL)

( * ) Notice: Subject to any disclaimer, the term of this patent is extended or adjusted under 35 U.S.C. 154(b) by 359 days.

(21) Appl. No.: 17/634,738

(22) PCT Filed: Aug. 10, 2020

(86) PCT No.: PCT/IL2020/050872
§ 371 (c)(1),
(2) Date: Feb. 11, 2022

(87) PCT Pub. No.: WO2021/028906
PCT Pub. Date: Feb. 18, 2021

(65) Prior Publication Data
US 2022/0277637 A1    Sep. 1, 2022

(30) Foreign Application Priority Data
Aug. 11, 2019    (IL) .......................................... 268628

(51) Int. Cl.
| G08B 21/10 | (2006.01) |
| G01V 1/01 | (2024.01) |
| G08B 21/18 | (2006.01) |

(52) U.S. Cl.
CPC ............... *G08B 21/10* (2013.01); *G01V 1/01* (2024.01); *G08B 21/182* (2013.01)

(58) Field of Classification Search
CPC .. G08B 21/10; G08B 21/182; G08B 13/1663; G01V 1/01; E04H 9/00; E04H 9/02; E02D 27/34; E02D 27/35; H04W 4/90
See application file for complete search history.

(56) References Cited

U.S. PATENT DOCUMENTS

| 6,342,842 B2 | 1/2002 | Chen |
| 7,073,453 B2 * | 7/2006 | Frazer ...................... D05C 3/04 |
| | | 112/117 |
| 2001/0033232 A1 * | 10/2001 | Chen ...................... G08B 21/10 |
| | | 340/689 |
| 2016/0083042 A1 * | 3/2016 | Voss ........................ B62K 25/28 |
| | | 280/283 |

FOREIGN PATENT DOCUMENTS

| CN | 101388137 A | 3/2009 |
| JP | 3081846 U | 11/2001 |
| JP | 2006226844 A | 8/2006 |

\* cited by examiner

*Primary Examiner* — Tung S Lau
(74) *Attorney, Agent, or Firm* — William H. Dippert; Laurence A. Greenberg; Werner H. Stemer

(57) ABSTRACT

A vertical motion and horizontal motion detection and alarm units for detecting vertical motion are described as well as a motion detection and alarm apparatus for detecting motion. A wide area seismic alarm system is described that comprises a plurality of motion detection and alarm apparatus as described that are located in plurality of locations throughout the monitored area.

16 Claims, 13 Drawing Sheets

EARTHQUAKE DETECTION AND ALARM UNIT AND SYSTEM

CROSS-REFERENCE TO RELATED PATENT APPLICATIONS

This patent application is a U.S. National Phase filing under 35 U.S.C. § 371 of co-pending PCT Patent Application No. PCT/IL2020/050872, filed Aug. 10, 2020, which is based upon and claims the priority of Israeli Patent Application No. 268628, filed Aug. 11, 2019, each of which is incorporated herein by reference in its entirety.

FIELD OF THE INVENTION

The present disclosed subject matter relates to an apparatus for detecting movements such as caused by earthquakes. More particularly, the present disclosed subject matter relates to an alarm unit and system for detecting and producing alarm signals if a movement larger than a preset threshold had occurred.

BACKGROUND

Earthquake sensing device is designed to sense strong earthquakes and to generate warning signals so that the affected population may take necessary protective actions accordingly.

Due to the importance of the earthquake sensing device, a variety of high precision, compact and low-cost earthquake sensing devices are being developed.

U.S. Pat. No. 5,408,457 (assigned to Osaka Gas Co., Ltd. and Kansai Gas Meter Co., Ltd.) disclosed an earthquake sensing device for use inside a gas meter. The earthquake sensing device is capable to sense strong earthquakes and comprises a steel ball hung inside a space surrounded by a continuous wall. When an earthquake takes place, the movement of the steel ball will cause a series of ON and OFF signals generated by an inductive circuit located above the steel ball. These ON/OFF signals may be used to determine the existence of an earthquake.

In U.S. Pat. No. 5,742,235, some features of earthquake were disclosed. According to their analysis, in an earthquake, its vertical waves (p-waves) will have a higher transmission speed than that of the horizontal waves (s-waves). On the other hand, the magnitude and the destroying power of the vertical wave are far smaller than that of the horizontal waves. As a result, in the U.S. Pat. No. 5,742,235, a micro vibration switch made from a semiconductor manufacture process was invented to sense the vertical waves of an earthquake. The advantage of this invention is that the structure of this earthquake sensor is simple and that its manufacture cost is relatively low. However, according to another analysis of the features of earthquakes, the magnitude of the vertical waves of an earthquake is very tiny (about 0.01 g). Under such a tiny scale, errors in the determination of an earthquake are easily caused, if only the vertical waves are sensed and are used as the only basis of the determination.

It is thus a need in the industry to provide a high-precision, compact and low-cost earthquake sensor.

SUMMARY

According to an aspect of the present disclosed subject matter, a vertical motion detection and alarm unit for detecting vertical motion is provided, the vertical motion detection and alarm unit comprising: a frame, attached or placed on the ground or a structure to be monitored; an upper rocker and a lower rocker, each connected to the frame by an axis, and capable of pivoting about the axis with respect to the frame, wherein the pivoting axis of both rockers are: parallel to each other, above each other, and essentially horizontal, and each having a counter weight, connected to the rocker at a distance from the pivoting axis; a tube, connecting the upper rocker and the lower rocker, such that: the upper end of the tube is connected to the upper rocker, with an axis, at a distance from, and on the opposite side from the counter weight, of the pivoting axis of the upper rocker, and the lower end of the tube is connected to the lowers rocker, with an axis, at essentially the same distance, and at the same side, which is opposite to the counter weight, from the pivoting axis of the lower rocker; a weight freely moving within the tube, and connected to the upper end of the tube with a spring, wherein the counter weights essentially balance the rocker against the weight of the tube, the spring and the weight; a lower needle, connected to the lower rocker and pointing essentially vertically towards the upper rocker; an adjustable resilient member, adjustably connected to the frame, and inserted to a cavity within the lower rocker; a trigger mechanism connected to the upper rocker comprising a spring loaded upper needle, wherein in armed state, the distal end of the upper needle is resting on the distal end of the lower needle, and wherein relative motion of the distal ends of the needle activates the trigger mechanism by allowing the spring loaded upper needle to be pushed by the spring to an activated position; a switch coupled to the spring loaded upper needle, and capable of producing alarm signal when the spring loaded upper needle moves to its activated position, wherein a vertical motion of the frame causes the rockers to rotate thus activating the trigger mechanism, and wherein changing the length of the resilient member which is inside the cavity changes the magnitude of the vertical motion required to activate the trigger mechanism.

According to another aspect of the present disclosed subject matter, a horizontal motion detection and alarm unit for detecting horizontal motion is provided, the horizontal motion detection and alarm unit comprising: a frame, attached or placed on the ground or a structure to be monitored; a gimbal, connected to the frame, and supporting a post, wherein the post is essentially vertically hung from the gimbal, and free to rotate in two directions about the gimbal, and having a lower needle connected to its upper end, and having a cavity at its lower end; a weight connected to the post, wherein the position of the weight along the post is adjustable; a trigger mechanism connected to the frame comprising a spring loaded upper needle, wherein in armed state, the distal end of the upper needle is resting on the distal end of the lower needle, and wherein motion of the distal end of the lower needle activates the trigger mechanism by allowing the spring loaded upper needle to be pushed by the spring to an activated position; a switch coupled to the spring loaded upper needle, and capable of producing alarm signal when the spring loaded upper needle moves to its activated position, wherein a horizontal motion of the frame, in any direction, causes the post to rotate thus activating the trigger mechanism, wherein changing the location of the weight along the post changes the magnitude of the horizontal motion required to activate the trigger mechanism, and wherein changing the length of the resilient member which is inside the cavity in the post further changes the magnitude of the horizontal motion required to activate the trigger mechanism.

According to another aspect of the present disclosed subject matter, a motion detection and alarm apparatus for detecting motion is provided, the apparatus for detecting motion comprising: a vertical motion detection and alarm unit for detecting vertical motion; and a horizontal motion detection and alarm unit for detecting horizontal motion, such that the motion detection and alarm apparatus is capable of detecting both vertical and horizontal motions, and is activated to producing an alarm signal when at least one of the vertical motion detection and alarm unit, or the horizontal motion detection and alarm unit is activated.

In some exemplary embodiments, the sensitivity of the vertical motion detection and alarm unit, and the sensitivity of the horizontal motion detection and alarm unit, are adjusted to detect seismic events.

In some exemplary embodiments, the sensitivity of the vertical motion detection and alarm unit, and the sensitivity of the horizontal motion detection and alarm unit, are adjusted to detect seismic events having magnitude larger than a preset value on the Richter scale.

In some exemplary embodiments, the motion detection and alarm apparatus further having an audio alarm sounding an alarm when the motion detection and alarm apparatus is activated.

In some exemplary embodiments, the motion detection and alarm apparatus further having a signal transmitter for transmitting an alarm signal to a remote location when the motion detection and alarm apparatus is activated.

In some exemplary embodiments, the motion detection and alarm apparatus is made of non-corroding materials and not affected by temperature and humidity.

In some exemplary embodiments, the motion detection and alarm apparatus is made of non-corroding materials and not affected by temperature and humidity.

In some exemplary embodiments, the resetting the trigger mechanism after activation is manually done by lifting the spring loaded upper needle to have the upper needle resting again on lower needle.

In some exemplary embodiments, the sensitivity of the vertical motion detection and alarm unit, and the sensitivity of the horizontal motion detection and alarm unit, are adjusted to detect manmade ground motion.

In some exemplary embodiments, the manmade ground motion is caused by at least one of digging or tunneling.

According to another aspect of the present disclosed subject matter, a wide area seismic alarm system is provided, the wide area seismic alarm system comprising: a plurality of motion detection and alarm apparatus, located in plurality of locations throughout the monitored area, each for detecting seismic event and transmitting alarm signal once activated; a plurality of sirens, for sounding alarm sound when activated; and a remote server, for receiving alarm signals from the motion detection and alarm apparatus, and activating at least one of the sirens in response to the alarm signals received from the motion detection and alarm apparatus.

According to yet another aspect of the present disclosed subject matter, a trigger for motion detector is provided, the trigger comprising: a lower needle; a spring loaded upper needle, wherein in armed state, the distal end of the upper needle is resting on the distal end of the lower needle, and wherein relative motion of the distal ends of the needles activates the trigger mechanism by allowing the spring loaded upper needle to be pushed by the spring to an activated position; and a switch coupled to the spring loaded upper needle, and capable of producing alarm signal when the spring loaded upper needle moves to its activated position.

In some exemplary embodiments, the trigger for motion detector further comprising resetting mechanism configured to reset the trigger from its activated position back to its armed state by pushing the spring loaded upper needle against the force of the spring a preset time after the trigger was activated.

In some exemplary embodiments, the preset time is three seconds.

In some exemplary embodiments, the resetting mechanism comprises a solenoid.

In some exemplary embodiments, the resetting mechanism comprises an electric motor.

Unless otherwise defined, all technical and scientific terms used herein have the same meaning as commonly understood by one of ordinary skill in the art to which this disclosed subject matter belongs. Although methods and materials similar or equivalent to those described herein can be used in the practice or testing of the present disclosed subject matter, suitable methods and materials are described below. In case of conflict, the specification, including definitions, will control. In addition, the materials, methods, and examples are illustrative only and not intended to be limiting.

BRIEF DESCRIPTION OF THE DRAWINGS

Some embodiments of the disclosed subject matter described, by way of example only, with reference to the accompanying drawings. With specific reference now to the drawings in detail, it is stressed that the particulars shown are by way of example and for purposes of illustrative discussion of the preferred embodiments of the present disclosed subject matter only, and are presented in the cause of providing what is believed to be the most useful and readily understood description of the principles and conceptual aspects of the disclosed subject matter. In this regard, no attempt is made to show structural details of the disclosed subject matter in more detail than is necessary for a fundamental understanding of the disclosed subject matter, the description taken with the drawings making apparent to those skilled in the art how the several forms of the disclosed subject matter may be embodied in practice.

In the drawings.

DETAILED DESCRIPTION

Figure 1A:
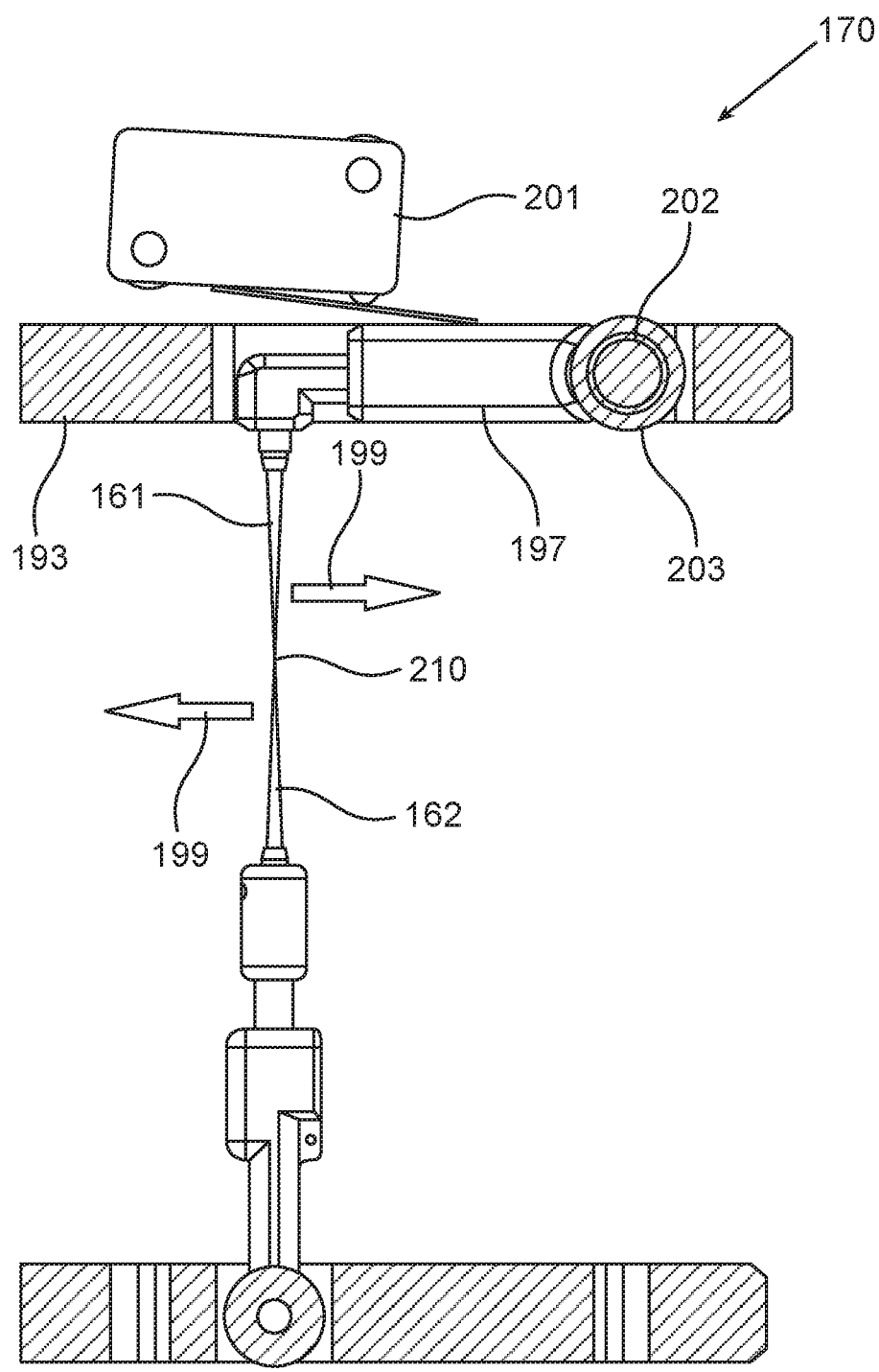
FIGS. 1A and 1B, schematically show a needle-based trigger mechanism used in an apparatus for detecting movements, in accordance with some exemplary embodiments of the disclosed subject matter.

Before explaining at least one embodiment of the disclosed subject matter in detail, it is to be understood that the disclosed subject matter is not limited in its application to the details of construction and the arrangement of the components set forth in the following description or illustrated in the drawings. The disclosed subject matter is capable of other embodiments or of being practiced or carried out in various ways. Also, it is to be understood that the phraseology and terminology employed herein is for the purpose of description and should not be regarded as limiting. The drawings are generally not to scale. For clarity, non-essential elements were omitted from some of the drawings.

The terms "comprises", "comprising", "includes", "including", and "having" together with their conjugates mean "including but not limited to". The term "consisting of" has the same meaning as "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this disclosed subject matter may be presented in a range format. It should be understood that the description in range format is merely for convenience and brevity and should not be construed as an inflexible limitation on the scope of the disclosed subject matter. Accordingly, the description of a range should be considered to have specifically disclosed all the possible sub-ranges as well as individual numerical values within that range.

It is appreciated that certain features of the disclosed subject matter, which are, for clarity, described in the context of separate embodiments, may also be provided in combination in a single embodiment. Conversely, various features of the disclosed subject matter, which are, for brevity, described in the context of a single embodiment, may also be provided separately or in any suitable sub-combination or as suitable in any other described embodiment of the disclosed subject matter. Certain features described in the context of various embodiments are not to be considered essential features of those embodiments, unless the embodiment is inoperative without those elements. In the drawings, same numbers refer to same or similar elements.

Figure 1B:
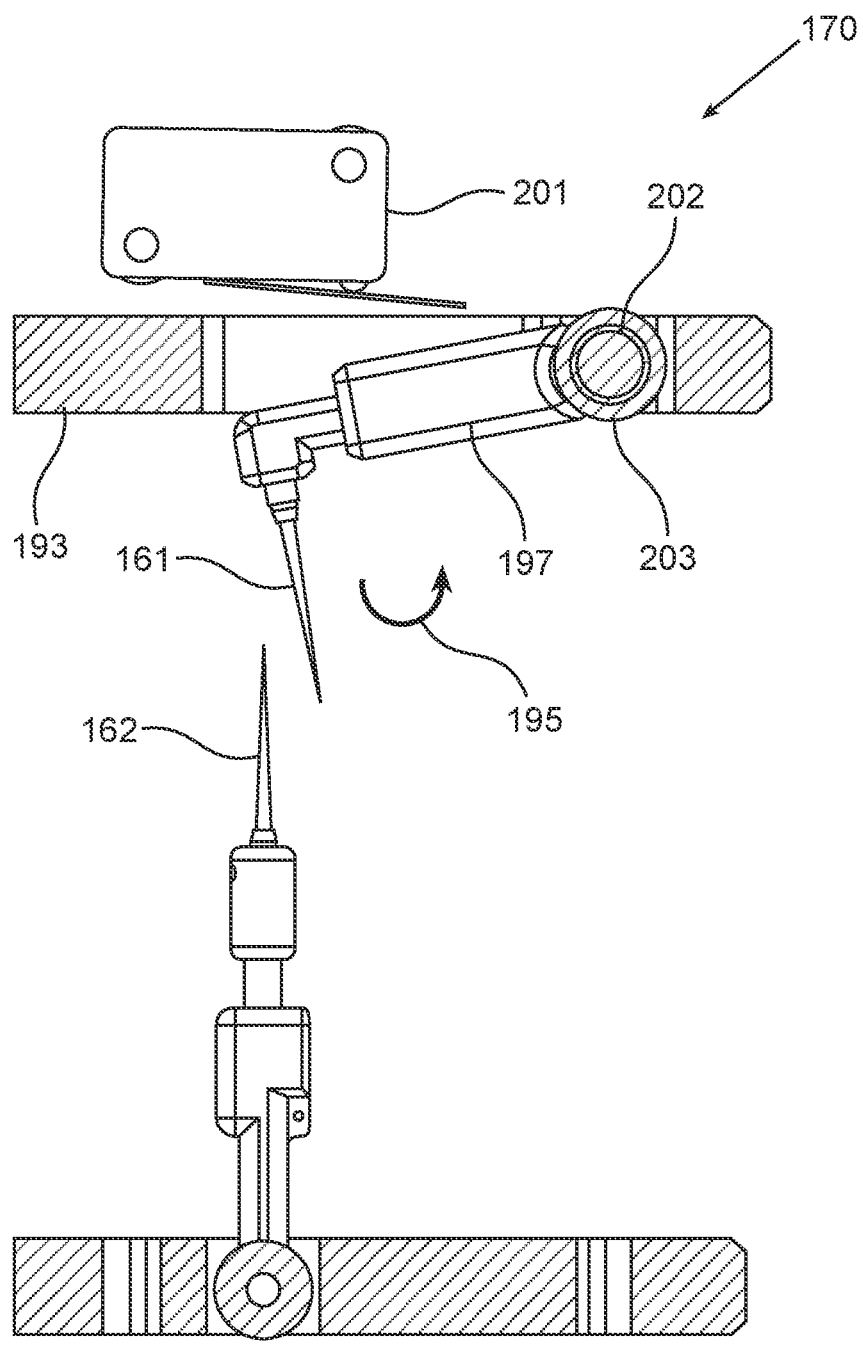

Referring now to FIGS. 1A and 1B, schematically showing the needle based trigger mechanism 170 used in the apparatus for detecting movements, in accordance with some exemplary embodiments of the disclosed subject matter.

Similar trigger mechanism 170 is used for detection both vertical and horizontal movement and it will be explained here in after.

In armed state, upper needle 161 is resting 210 on lower needle 162 as seen in FIG. 1A. If one or both needle move 199 with respect to the other in any direction, the trigger mechanism is activated as seen in FIG. 1B. Once the upper needle is not resting on the lower needle, the needle assembly 197 is forced by needle spring 203 to rotate 195 about the needle axis 202 which rests on its support 193, and micro-switch 201 is activated to produce an electric alarm signal.

Since the heads of needles 161 and 162 are narrow, even a small relative movement of the needles is sufficient to activate the trigger mechanism 170.

Resetting the trigger mechanism 170 is manually done by lifting the needle assembly 197 to have the upper needle 161 resting again on lower needle 162.

Figure 2A:
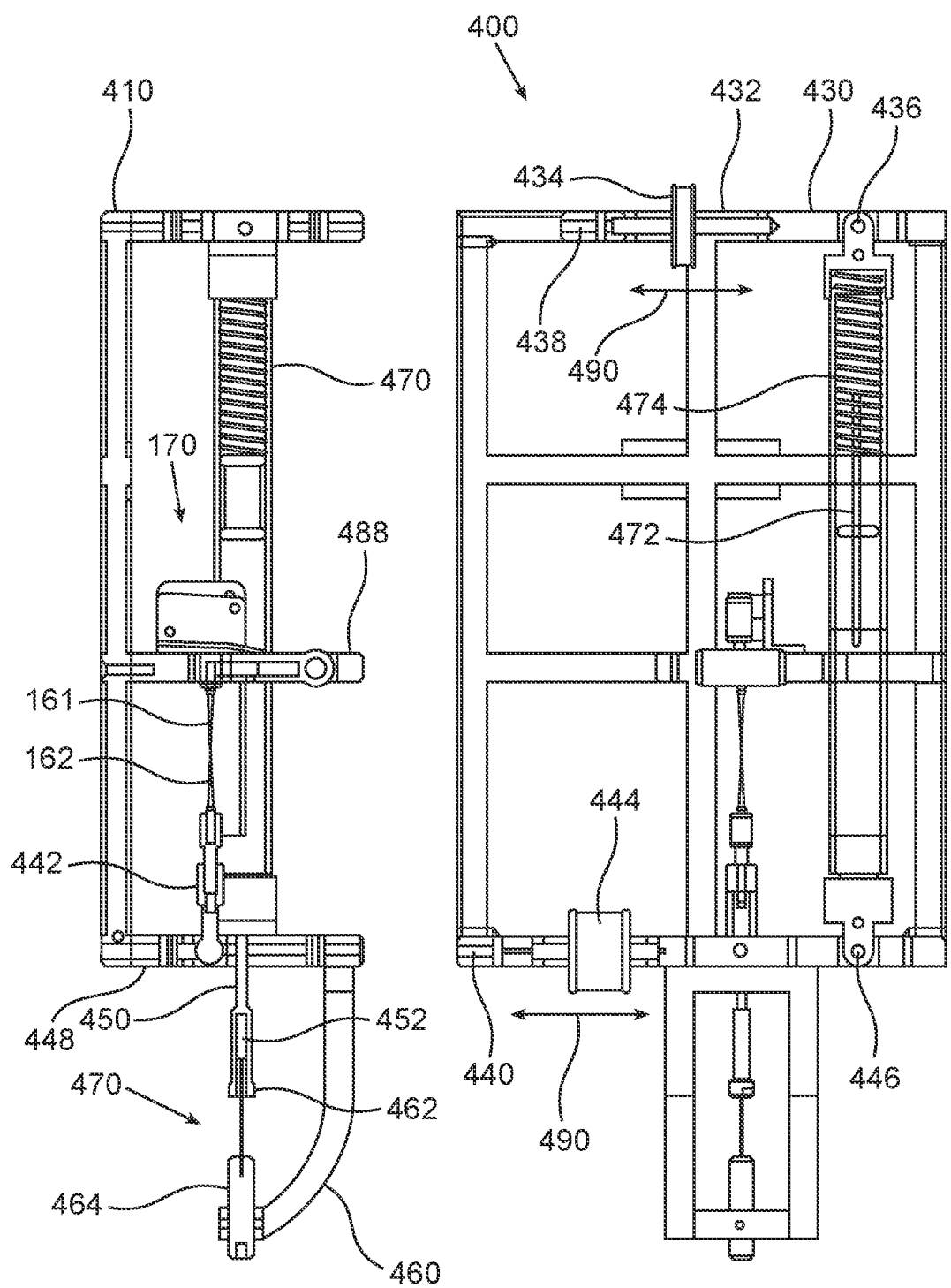
FIG. 2A schematically shows a vertical unit for detecting vertical movements in accordance with some exemplary embodiments of the disclosed subject matter.

Referring now to FIG. 2A schematically showing a vertical unit 400, for detecting vertical movements in accordance with some exemplary embodiments of the disclosed subject matter.

Vertical unit 400 comprises a frame 410 to which first pedestal 438, second pedestal 488, third pedestal 448, and forth pedestal 460 are connected.

Trigger mechanism 170 is situated on second pedestal 448.

Upper rocker 430 and lower rocker 440 are respectively capable of rocking about their respective upper 432 and lower 442 rocking axis in respect to first pedestal 438 and third pedestal 448. Upper rocker 430 and lower rocker 440 are restricted to remain parallel to each other, as they are connected by pipe 470 which connected to the upper rocker 430 via pivot 436 and to the lower rocker 440 via pivot 446.

A weight 472 is connected to the top of pipe 470 with a spring 474, such that weight 472 is confined to move freely up and down within the pipe. Upper counter weight 434 and lower counter weight 444 are used for balancing the rockers against the weight of the pipe and the weight within it. Optionally, upper counter weight 434 and lower counter weight 444 can be moved 490 along the respective rocker to enable balancing the rockers.

Lower needle 162 is connected to lower rocker 440 by post 450 and rotates with it about axis 442. Post 450 has a cavity 452 into which resilient element 462 is inserted. Resilient element 462 can be moved up or down with respect to cavity 452 by rotating the vertical sensitivity adjustment knob 464 which is screwed into forth pedestal 460. The lowering resilient element 462 exposes more of the resilient element 462 outside cavity 452, making the system more sensitive.

Inertia of counter weights 434 and 444 causes the rockers to rotate counterclockwise and the spring to extend in response to an upward motion of the frame, thus causing activation of trigger mechanism 170. Trigger mechanism 170 is similarly activated due to a downward motion of the frame.

All axes and pivots are preferably low friction type as to increase the sensitivity of the unit. Grease is preferably not used for low maintenance.

Figure 2B:
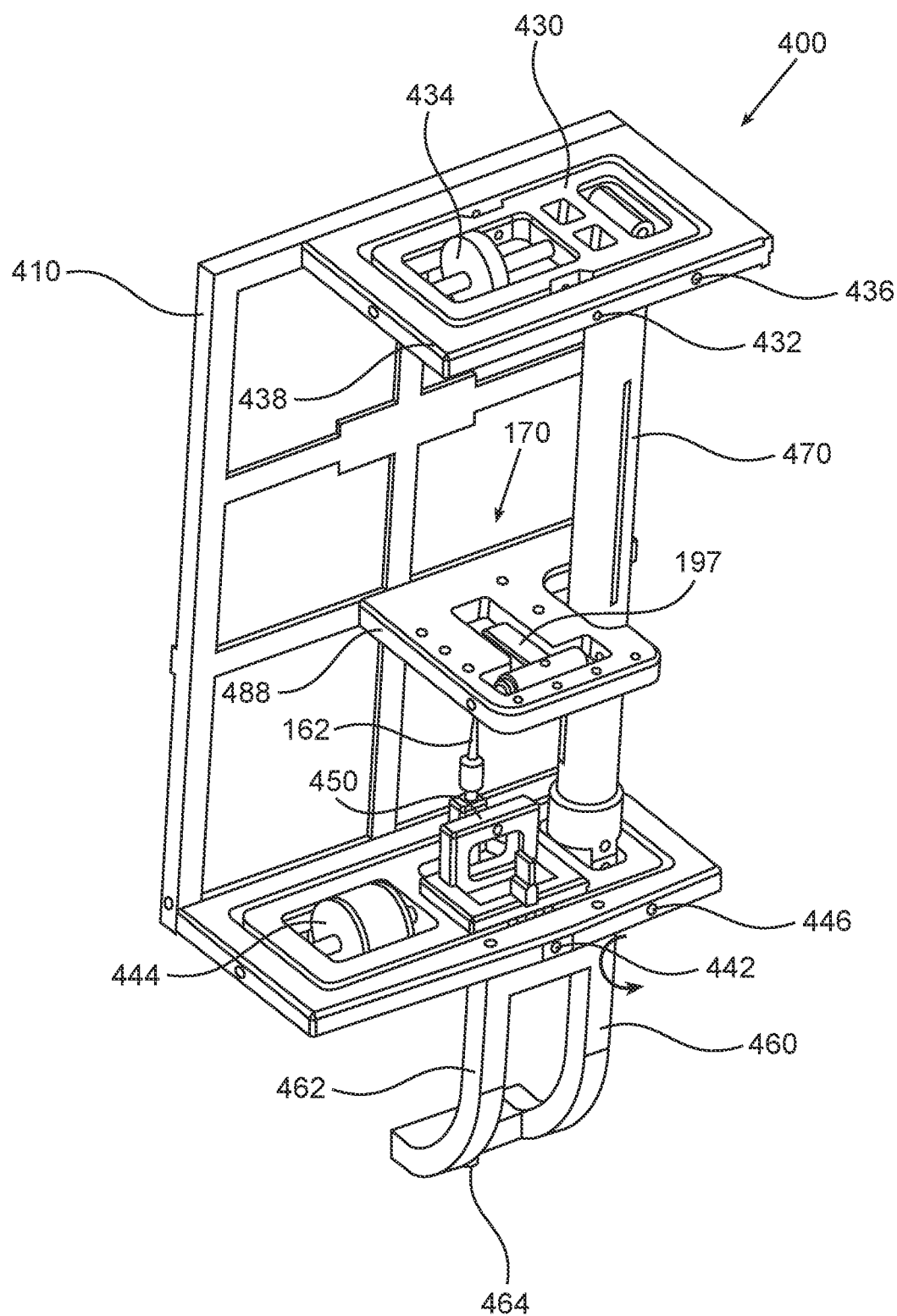
FIGS. 2B and 2C schematically show engineering drawings vertical unit, for detecting vertical movements in accordance with some exemplary embodiments of the disclosed subject matter.
Figure 2C:
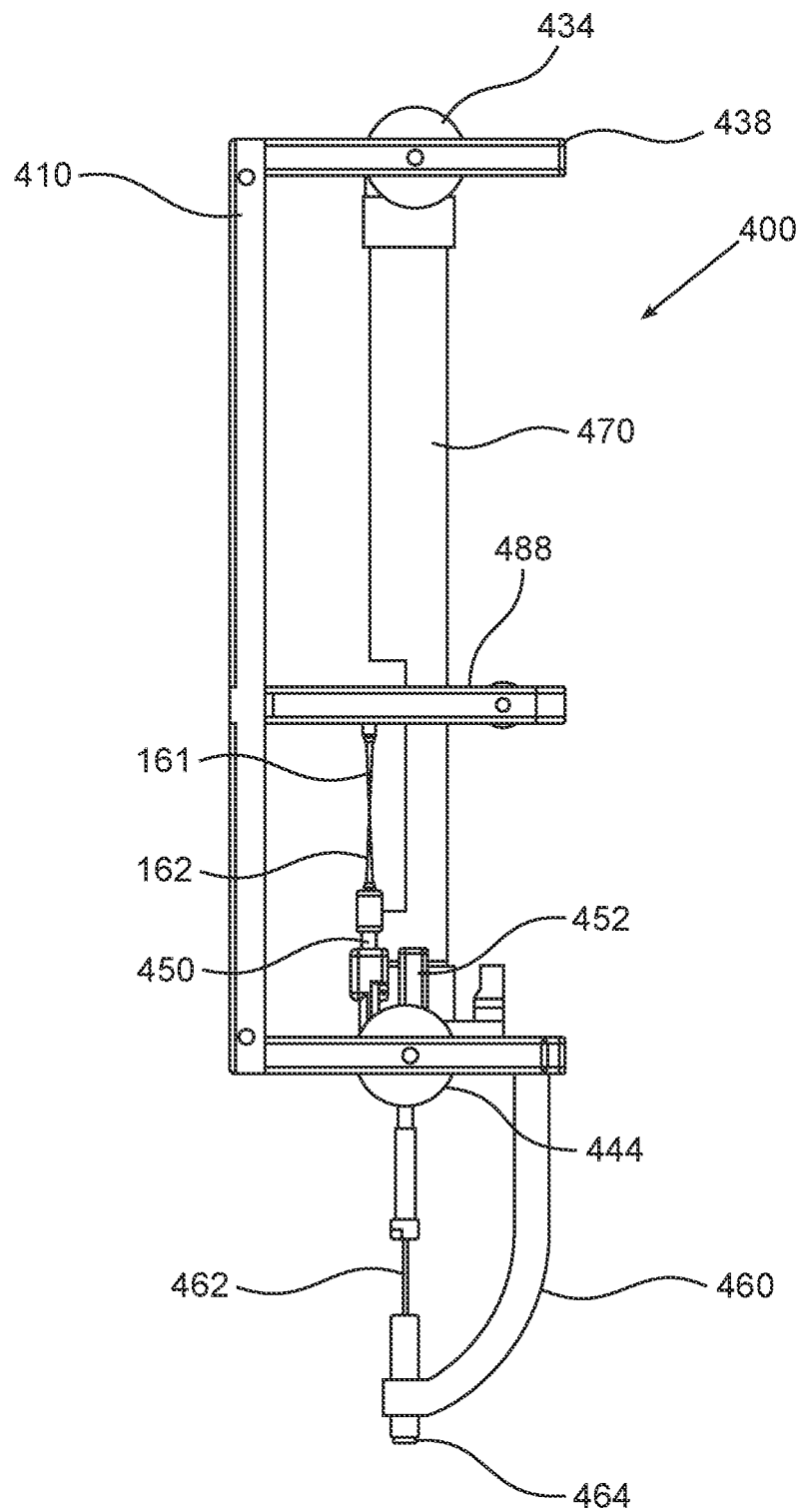

Referring now to FIGS. 2B and 2C schematically showing an engineering drawings vertical unit 400, for detecting vertical movements in accordance with some exemplary embodiments of the disclosed subject matter.

FIG. 2B depicts an isometric view and FIG. 2C a side view.

Figure 2D:
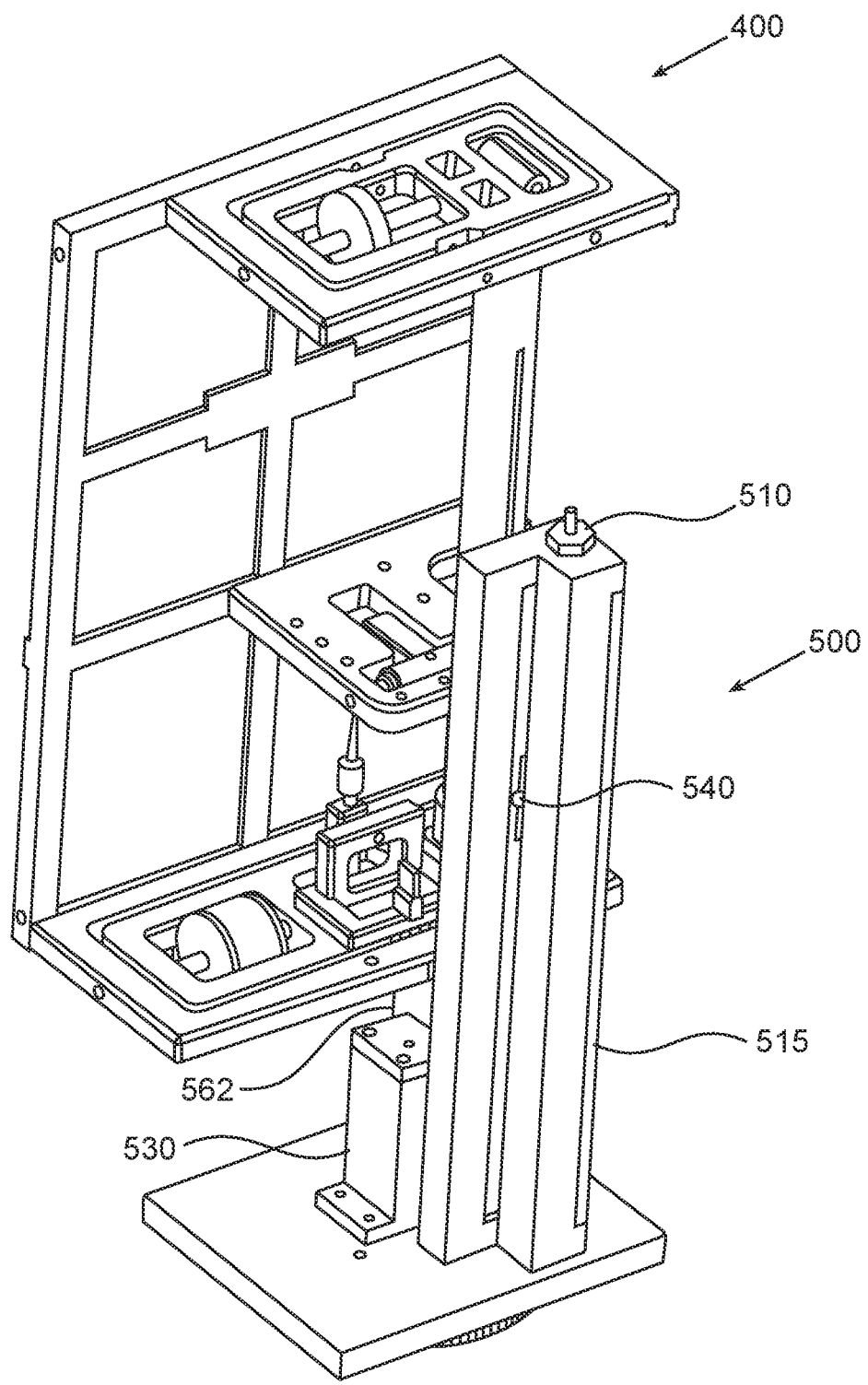
FIGS. 2D and 2E schematically show engineering drawings vertical unit having a calibration mechanism for detecting vertical movements in accordance with some exemplary embodiments of the disclosed subject matter.
Figure 2E:
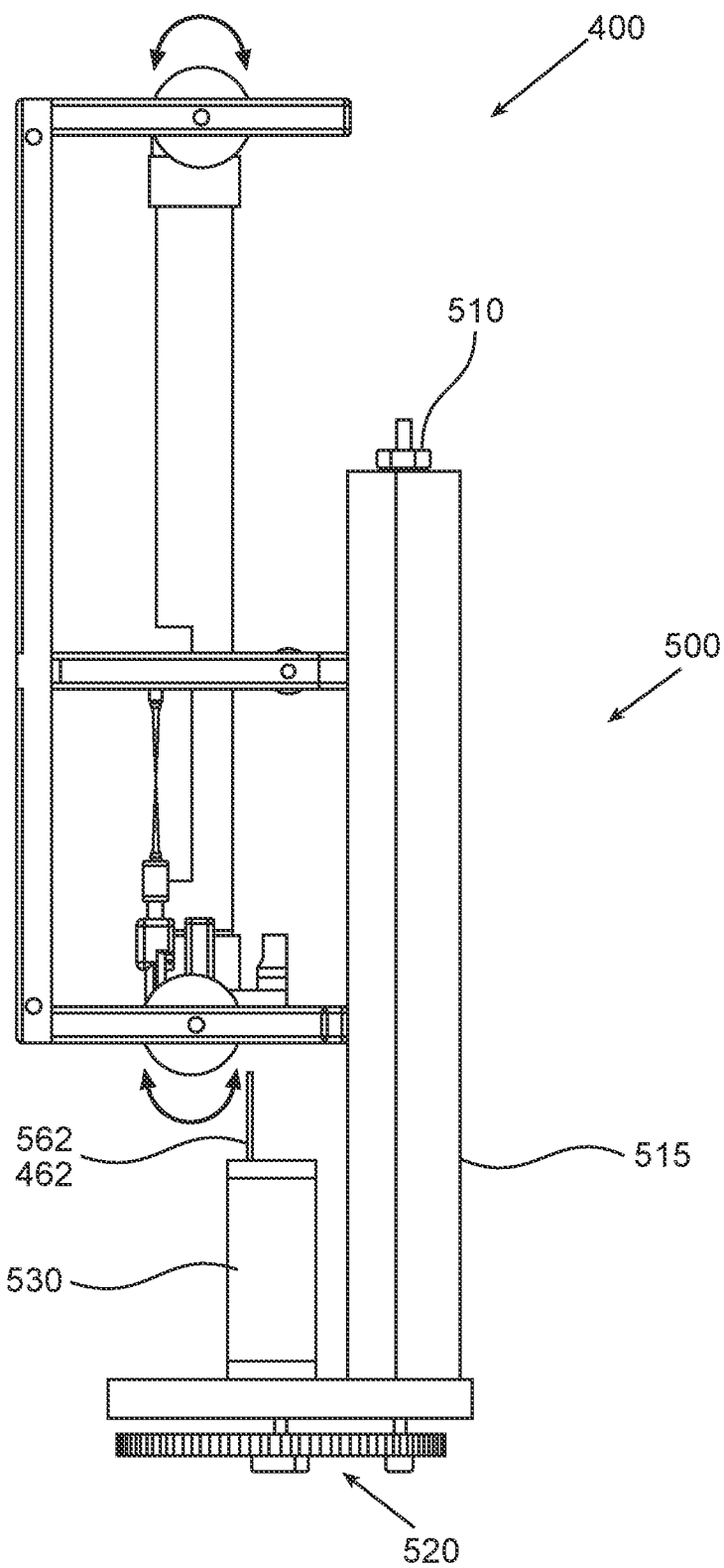

Referring now to FIGS. 2D and 2E schematically showing an engineering drawings vertical unit 400 having a calibration mechanism 500, for detecting vertical movements in accordance with some exemplary embodiments of the disclosed subject matter.

FIG. 2D depicts an isometric view and FIG. 2E a side view.

In FIGS. 2D and 2E, an accurate calibration scale mechanism 500 was added. Turning calibration knob 510 moves the sensitivity indicator 540 up and down along a scale (scale markings are not seen in this figure). Calibration knob 510 also rotates reduction gear 520 that actuate calibration box 530 to extend or retract resilient element 462.

Figure 2F:
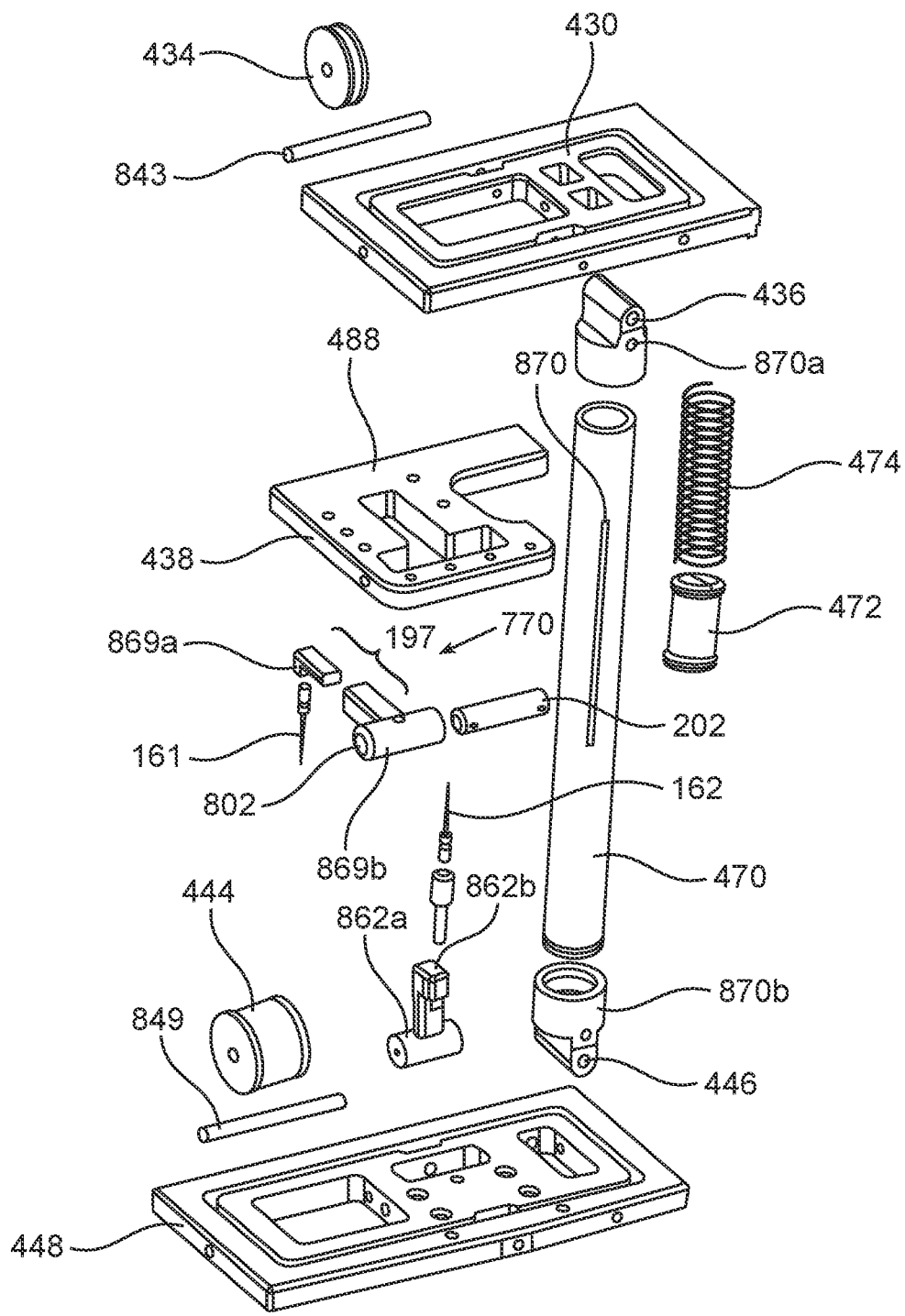
FIG. 2F schematically shows exploded view of some parts of the vertical unit in accordance with some exemplary embodiments of the disclosed subject matter.

Referring now to FIG. 2F schematically showing exploded view of some parts of the vertical unit 400, for detecting vertical movements in accordance with some exemplary embodiments of the disclosed subject matter.

Only parts not explained before will be explained herein. The details seen are given as non-limiting exemplary embodiments.

Pipe 470 is having upper end plug 470a and lower end plug showing the cavity for pivots 436 and 446 for connecting to first pedestal 438, and third pedestal 448 respectively. An optional viewing slit 870 allows observing the weight 472.

Upper beam 843 and lower beam 844 are configured for positioning upper counter weight 434 and lower counter weight 444 respectively.

Some details of trigger 170 are also seen here, Specially, position of upper needle 161 can be adjusted in the horizontal plane by moving and fixing the sleeve 802 over needle axis 202, and extending or shortening needle assembly 197 by adjusting the positioning of distal part 869a within the cavity in proximal part 869b. Thus ensuring that the end of upper needle 161 is aligned with the end of the lower needle 162.

The height of the lower needle 162 can be adjusted to meet the end of the upper needle 161 by adjusting the relative positioning of upper and lower needle base parts 862a and 862b.

Figure 3A:
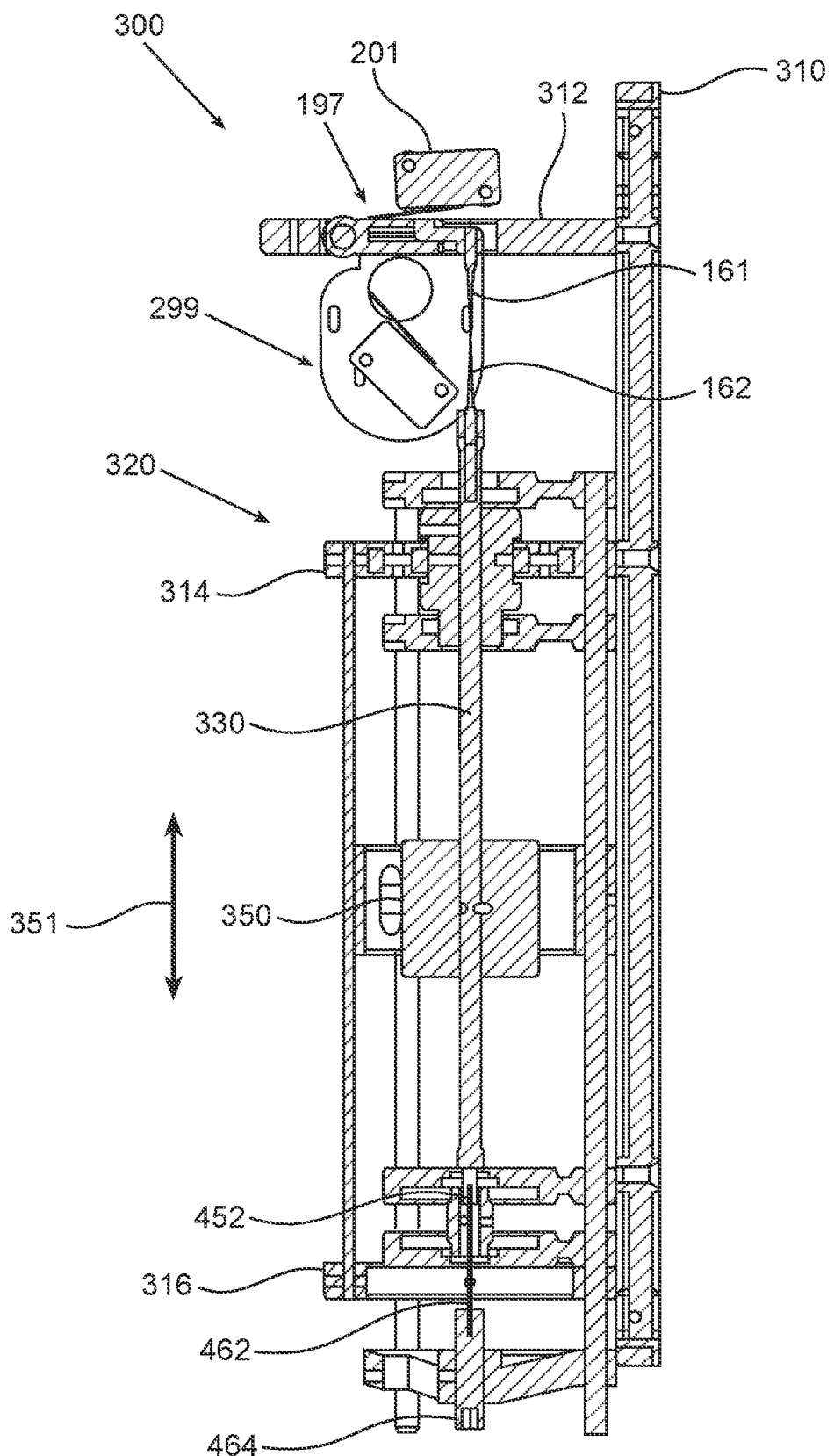
FIG. 3A schematically shows a horizontal unit, for detecting horizontal movements in all directions in accordance with some exemplary embodiments of the disclosed subject matter.

Referring now to FIG. 3A schematically showing a horizontal unit 300, for detecting horizontal movements in all directions in accordance with some exemplary embodiments of the disclosed subject matter.

Horizontal unit 300 comprises a frame 410, to which first pedestal 312, second pedestal 314, and third pedestal 316.

First pedestal 312 houses the trigger mechanism 170 was already discussed.

A gimbal 230 housed in the second pedestal 314 supports post 330 having lower needle 162 at its upper end. A weight 350 is attached to post 330. Weight 350 can be moved 351 and fixed in position along post 330 to adjust the sensitivity.

Fine sensitivity adjustments are performed in a similarly to the way it is done in the vertical unit. Third pedestal 316 is carrying the calibration knob 464' that extends or retracts resilient element 462' inside cavity 452' in the bottom of post 330.

As post 330 freely rotates in all directions on gimbal 320, movement of frame 310 in any horizontal direction, which is large enough to overcome the resilient element 462', will trigger the alarm.

Figure 3B:
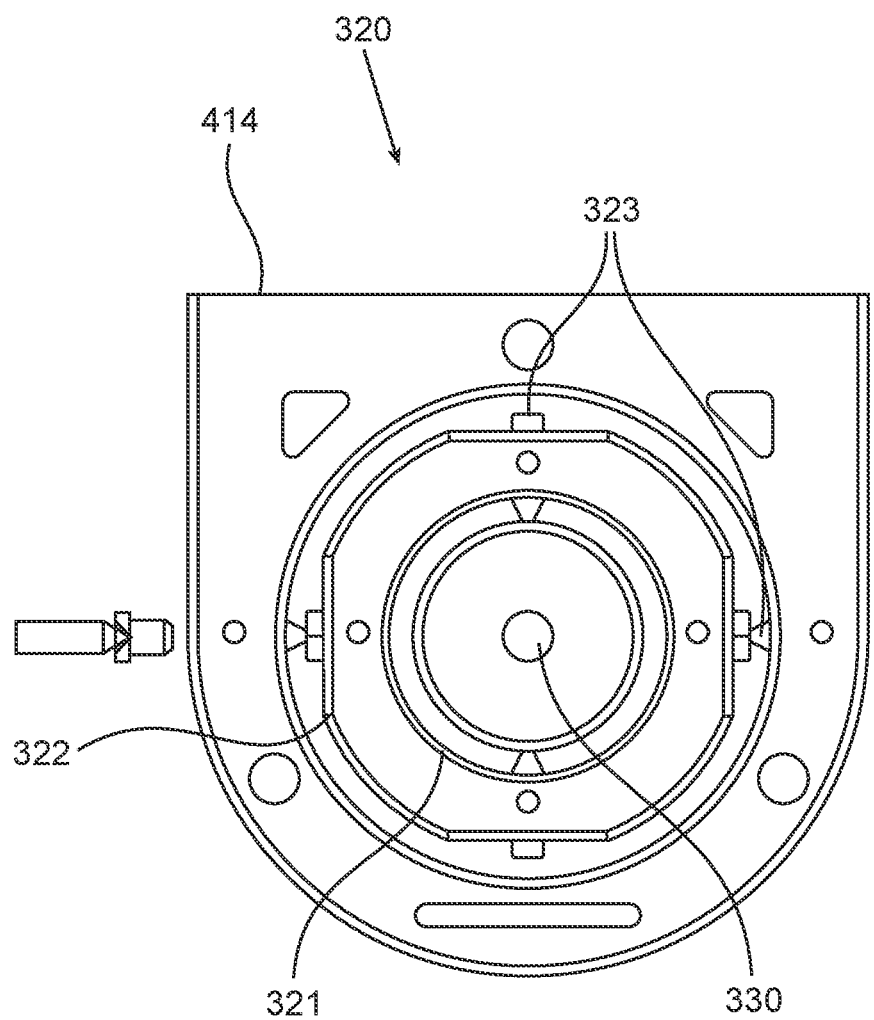
FIG. 3B schematically shows an enlarge view of gimbal, in accordance with some exemplary embodiments of the disclosed subject matter.

Referring now to FIG. 3B schematically showing an enlarge view of gimbal 320, in accordance with some exemplary embodiments of the disclosed subject matter.

Inner section 321 supporting post 330 can rotate in one direction with respect to ring 322 that can rotate in the perpendicular direction in respect to second pedestal 314 using low friction pivots 323.

Figure 3C:
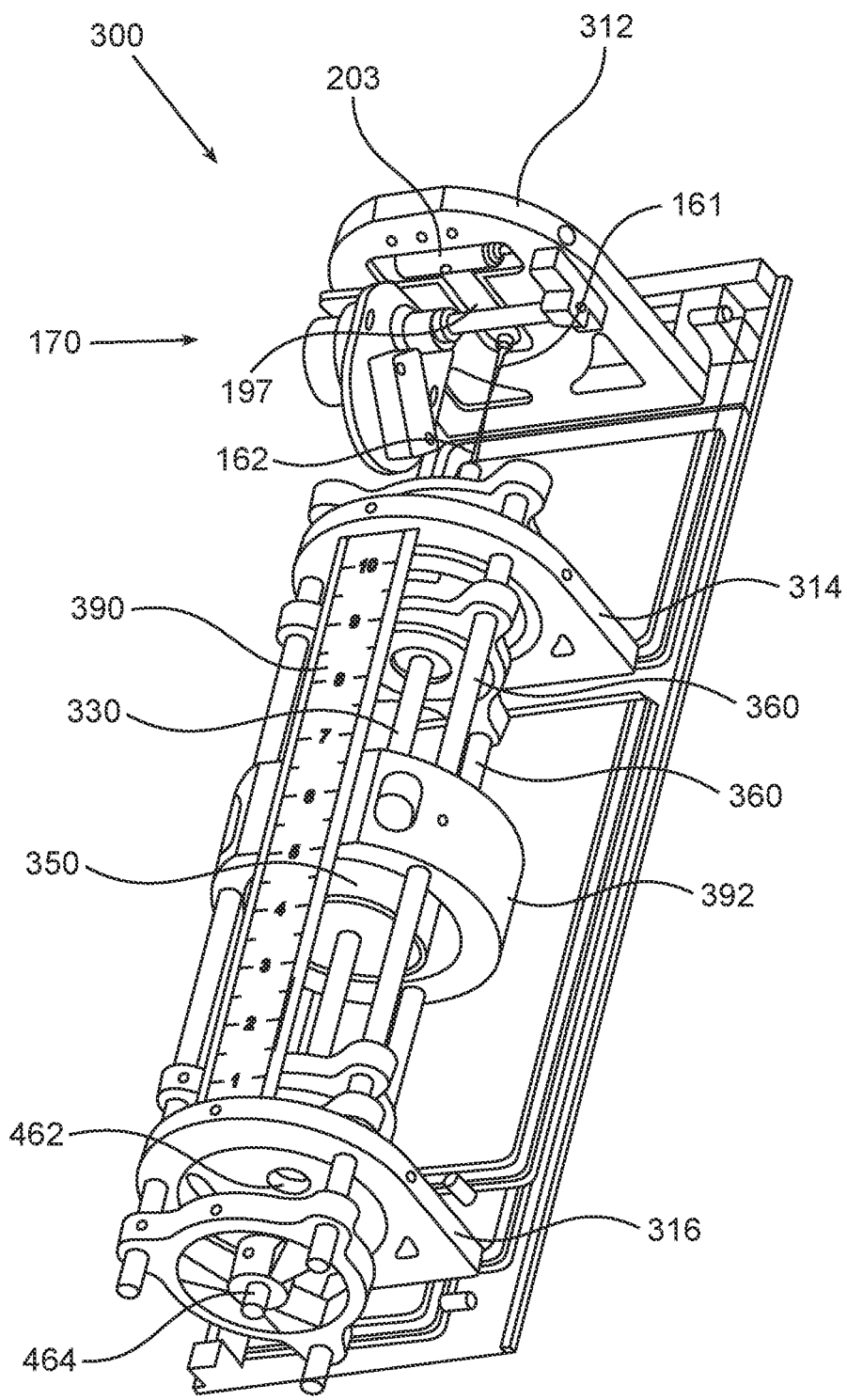
FIG. 3C schematically shows isometric view of an engineering drawing of a horizontal unit, for detecting horizontal movements in accordance with some exemplary embodiments of the disclosed subject matter.

Referring now to FIG. 3C schematically showing isometric view of an engineering drawing of a horizontal unit 300, for detecting horizontal movements in accordance with some exemplary embodiments of the disclosed subject matter.

In addition to the elements already discussed, the figure shows the calibration scale 390 and the sensitivity indicator 392 positioned at the height of weight 350. Ramp 394, moving on poles 360, is used for carefully raising or lowering the weight 350 along post 330 together with indicator 392 which moves along and then secured to poles 360. Poles 360 are also used to secure the weight when transporting the unit.

It should be noted that due to the use of a gimbal, and the symmetric nature of the needles, the horizontal unit has the same sensitivity to motion in any direction. This is in contrast to other unit types that uses two sensors, one for each horizontal directions, in which the sensitivity may be lower for motion in the direction at 45 degrees between the two axes.

Electromechanical needle resetting mechanize 299, such as a solenoid or an electric motor may optionally be used for re-arming the device (for example the horizontal and/or vertical unit) after it was triggered.

Figure 4:
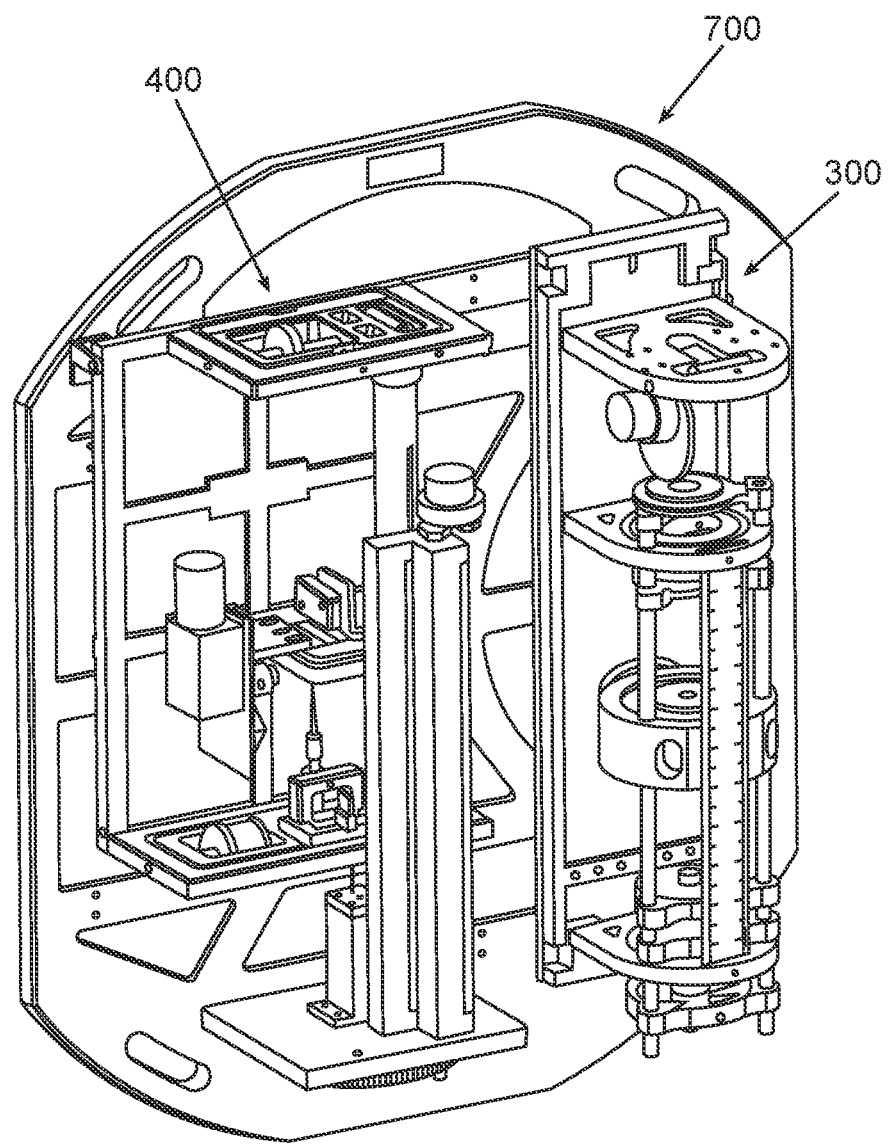
FIG. 4 schematically shows isometric view of an engineering drawing of both horizontal unit and vertical unit combined in a motion detection apparatus, for detecting both horizontal and vertical movements in accordance with some exemplary embodiments of the disclosed subject matter.

Referring now to FIG. 4 schematically showing isometric view of an engineering drawing of both horizontal unit 300 and vertical unit 400 combined in a motion detection apparatus 700, for detecting both horizontal and vertical movements in accordance with some exemplary embodiments of the disclosed subject matter.

Figure 5:
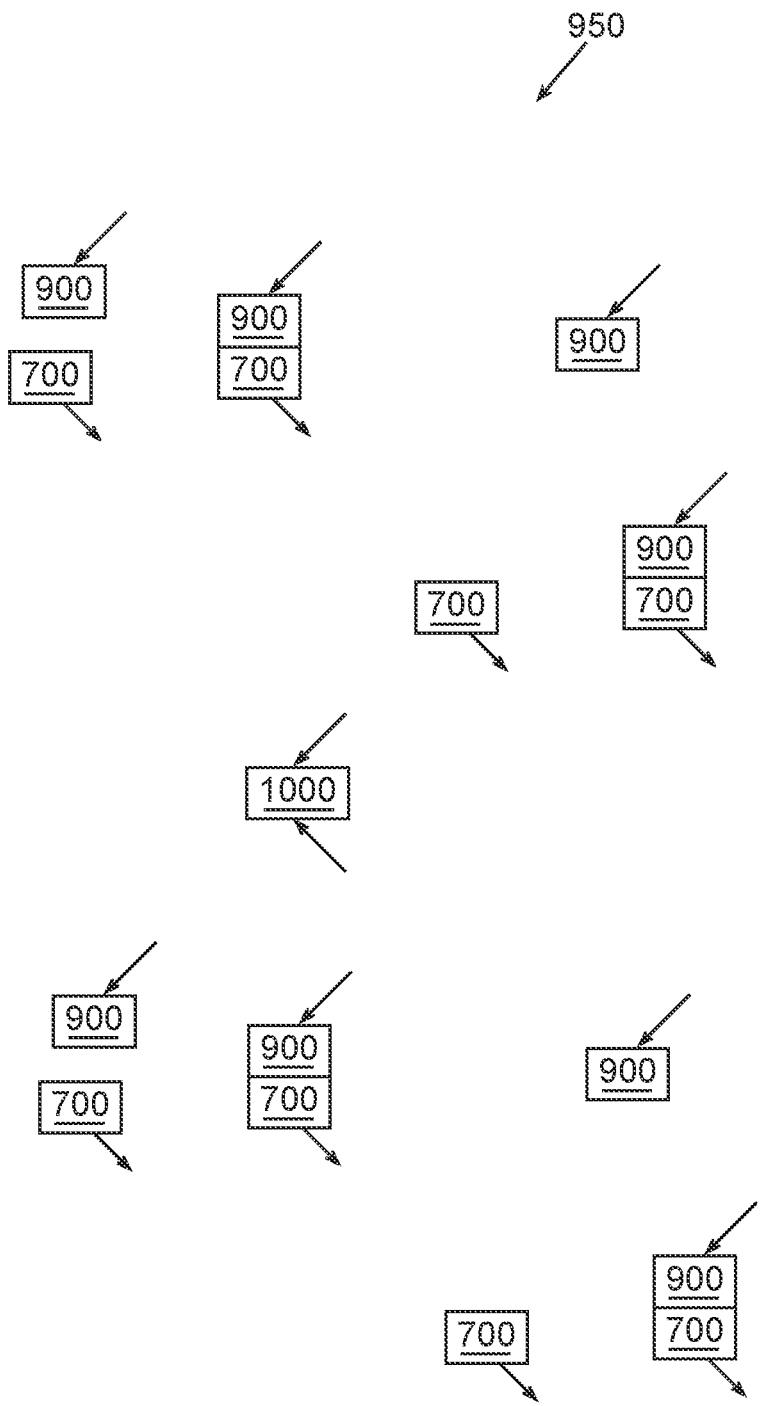
FIG. 5 schematically shows wide area seismic alarm system in accordance with some exemplary embodiments of the disclosed subject matter.

Referring now to FIG. 5 schematically showing wide area seismic alarm system 950 in accordance with some exemplary embodiments of the disclosed subject matter.

A plurality of motion detection apparatuses 700 are positioned across the country, preferably some motion detection apparatuses 700 are positioned near known or suspected fault lines. Each of the motion detection apparatuses 700 is capable of transmitting an alert signal when it is activated over phone, internet or wireless communication channels. Additionally, a plurality of alarm siren 900 is positioned across the country, preferably near populated areas. Each alarm siren 900 is capable of receiving alarm signal and be activated to alert nearby population of seismic event. In some cases, detection apparatuses 700 and alarm siren 900 are in proximity to each other and the alarm siren is locally connected to the detection apparatuses and is locally activated by it.

An alarm server 100 monitors signals from the motion detection apparatuses and determine which of the alarm sirens to activate according to the relative locations of the activated motion detection apparatuses, timing of their activation and sequence of their activation.

The units and apparatus of the present disclosed subject matter are made of non-corroding materials such as Aluminum, Stainless steel and plastic such that they are not affected by temperature changes, or humidity.

The units can be finely calibrated to the desired triggering threshold. Being a mechanical device enables long term stability and minimal power consumption.

The units and apparatus of the present disclosed subject matter may be used for detection of natural and manmade movements. For example, the units and apparatus may be used for detection of digging or tunneling activity in the vicinity.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A vertical motion detection and alarm unit for detecting vertical motion comprising:
   a frame having an upper side and a lower side, attached or placed on the ground or a structure to be monitored;
   an upper rocker connected on said upper side by an upper axis and a lower rocker connected on said lower side by a lower axis, wherein
   said upper rocker and said lower rocker are capable of pivoting about said upper axis and said lower axis, respectively, with respect to said frame,
   wherein the upper axis and the lower axis are parallel and horizontal to each other, and
   wherein said upper rocker has an upper counter weight at a distance from the upper axis and said lower rocker has a lower counter weight at a distance from the lower axis;
   a pipe having an upper end and a lower end and a weight freely moving within the pipe and connected to the upper end with a spring, the pipe being connected between said upper rocker and said lower rocker, such that:
   the upper end is connected to said upper rocker with an upper pivot, at a distance from and on an opposite side from the upper counter weight, and
   the lower end is connected to said lower rocker with a lower pivot, at the distance and opposite to the lower counter weight;
   wherein said upper counter weight and said lower counter weight balance the upper rocker and the lower rocker against the weight in the pipe;
   a lower needle connected to the lower rocker and pointing substantially vertically towards the upper rocker;
   an adjustable resilient member connected to said lower side of the frame, and inserted to a cavity within said lower rocker;
   a trigger mechanism connected to said upper rocker wherein the trigger mechanism comprises a spring-loaded upper needle, wherein in an armed state, a distal end of said spring-loaded upper needle rests on a distal end of said lower needle, and
   wherein relative motion between the distal end of said lower needle and the distal end of said spring-loaded upper needle activates said trigger mechanism by allowing the spring-loaded upper needle to be pushed by the spring to an activated position; and
   a switch coupled to said spring-loaded upper needle is capable of producing an alarm signal when said spring-loaded upper needle moves to its activated position,
   wherein a vertical motion of said frame causes said upper rocker and said lower rocker to rotate thus activating said trigger mechanism, and
   wherein changing the length of said resilient member changes a magnitude of said vertical motion that is required to activate said trigger mechanism.

2. A motion detection and alarm apparatus for detecting motion comprising:
   a vertical motion detection and alarm unit for detecting vertical motion of claim 1; and
   a horizontal motion detection and alarm unit for detecting horizontal motion comprising:
   a frame attached or placed on the ground or a structure to be monitored;
   a gimbal connected to said frame and supporting a post, wherein said post is substantially vertically hung from said gimbal and free to rotate in two directions about said gimbal, and
   wherein said post has a lower needle connected to its upper end and a cavity at its lower end;
   a weight connected to said post, wherein the position of said weight along said post is adjustable;
   a trigger mechanism connected to said frame and comprising a spring-loaded upper needle, wherein in an armed state, a distal end of said spring-loaded upper needle rests on a distal end of said lower needle, and
   wherein motion of the distal end of said lower needle activates said trigger mechanism by allowing the spring-loaded upper needle to be pushed by the spring to an activated position;
   a switch coupled to said spring-loaded upper needle is capable of producing an alarm signal when said spring-loaded upper needle moves to its activated position,
   wherein a horizontal motion of said frame, in any direction, causes said post to rotate, thus activating said trigger mechanism,
   wherein changing the location of said weight along said post changes a magnitude of said horizontal motion that is required to activate said trigger mechanism, and
   wherein changing a length of a resilient member which is inside a cavity in said post further changes the magnitude,
   such that the motion detection and alarm apparatus is capable of detecting both vertical and horizontal motions, and
   is activated to produce an alarm signal when at least one of said vertical motion detection and alarm unit, or the horizontal motion detection and alarm unit is activated.

3. The vertical motion detection and alarm unit for detecting vertical motion of claim 1, wherein resetting the trigger mechanism after activation is manually done by lifting the spring-loaded upper needle to have the upper needle resting again on the lower needle.

4. The vertical motion detection and alarm unit for detecting vertical motion of claim 1, wherein a sensitivity of the vertical motion detection and alarm unit is adjusted to detect seismic events.

5. The vertical motion detection and alarm unit for detecting vertical motion of claim 1, further having an audio alarm sounding an alarm when said motion detection and alarm apparatus is activated.

6. The vertical motion detection and alarm unit for detecting vertical motion of claim 1, further having a signal transmitter for transmitting an alarm signal to a remote location when said motion detection and alarm apparatus is activated.

7. The vertical motion detection and alarm unit for detecting vertical motion of claim 1, wherein the motion detection and alarm apparatus is made of non-corroding materials and not affected by temperature and humidity.

8. The motion detection and alarm apparatus of claim 2, wherein a sensitivity of the vertical motion detection and alarm unit, a sensitivity of the horizontal motion detection and alarm unit, or both are adjusted to detect seismic events.

9. The motion detection and alarm apparatus of claim 2, further having an audio alarm sounding an alarm when said motion detection and alarm apparatus is activated.

10. The motion detection and alarm apparatus of claim 2, further having a signal transmitter for transmitting an alarm signal to a remote location when said motion detection and alarm apparatus is activated.

11. The motion detection and alarm apparatus of claim 2, wherein the motion detection and alarm apparatus is made of non-corroding materials and not affected by temperature and humidity.

12. The vertical motion detection and alarm unit for detecting vertical motion of claim 4, wherein the sensitivity is adjusted to detect seismic events having magnitude larger than a preset value on the Richter scale.

13. The vertical motion detection and alarm unit for detecting vertical motion of claim 4, wherein the sensitivity of the horizontal motion detection and alarm unit, are adjusted to detect manmade ground motion.

14. The motion detection and alarm apparatus of claim 8, wherein the sensitivity of the vertical motion detection and alarm unit, the sensitivity of the horizontal motion detection and alarm unit, or both are adjusted to detect seismic events having magnitude larger than a preset value on the Richter scale.

15. The motion detection and alarm apparatus of claim 8, wherein the sensitivity of the vertical motion detection and alarm unit, the sensitivity of the horizontal motion detection and alarm unit, or both are adjusted to detect manmade ground motion.

16. The motion detection and alarm apparatus of claim 15, wherein the manmade ground motion is caused by at least one of digging or tunneling.

* * * * *